US009577875B2

(12) United States Patent
Agrawal et al.

(10) Patent No.: US 9,577,875 B2
(45) Date of Patent: Feb. 21, 2017

(54) PERFORMING VALUE AND CONTEXT AWARE COMMUNICATIONS NETWORKING

(71) Applicant: International Business Machines Corporation, Armonk, NY (US)

(72) Inventors: Dakshi Agrawal, Monsey, NY (US); Chatschik Bisdikian, Chappaqua, NY (US); Kang-Won Lee, Nanuet, NY (US); Ramya Raghavendra, White Plains, NY (US); Ho Yin Starsky Wong, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 13/651,951

(22) Filed: Oct. 15, 2012

(65) Prior Publication Data

US 2014/0133348 A1    May 15, 2014

(51) Int. Cl.

| | |
|---|---|
| *H04L 12/28* | (2006.01) |
| *H04L 12/24* | (2006.01) |
| *H04L 12/851* | (2013.01) |
| *H04W 28/02* | (2009.01) |
| *H04L 12/815* | (2013.01) |

(Continued)

(52) U.S. Cl.
CPC ......... *H04L 41/0803* (2013.01); *H04L 41/082* (2013.01); *H04L 41/5054* (2013.01); *H04L 47/23* (2013.01); *H04L 47/24* (2013.01); *H04W 28/0268* (2013.01); *H04L 45/04* (2013.01); *H04L 47/2441* (2013.01); *H04L 47/32* (2013.01)

(58) Field of Classification Search
CPC .................................................. H04L 41/0803

USPC ......................................................... 370/254
See application file for complete search history.

(56) References Cited

U.S. PATENT DOCUMENTS

| | | | |
|---|---|---|---|
| 6,092,096 A | 7/2000 | Lewis | |
| 7,468,979 B2 * | 12/2008 | Ricciulli | 370/392 |

(Continued)

OTHER PUBLICATIONS

IBM TDB; Maruyama, K; Moss, FH; Woo, LS; Dynamic Generation of Explicit Paths for the Addition of an End Node to a Network; May 1, 1980 (3 pages).

(Continued)

*Primary Examiner* — Christopher R Crompton
(74) *Attorney, Agent, or Firm* — Harrington & Smith

(57) ABSTRACT

An aspect of this invention is a computer-executable method for distributing one or more features associated with information to be transported by a communications network that includes a plurality of end nodes interconnected via a plurality of network nodes. The method includes receiving one or more features associated with information to be transported by the communications network, wherein the one or more features are specified at an end node of the plurality of end nodes for receipt by a network node of the plurality of network nodes; responsive to the one or more received features, configuring at least a portion of the communications network to perform actions on information based upon the features; receiving the information using the plurality of network nodes; and based at least on the received features and the configuring, performing one or more actions with the information. Illustratively, the one or more actions comprise sending the information to one or more edge entity nodes in accordance with the configuring and the received features.

15 Claims, 4 Drawing Sheets

(51) Int. Cl.
*H04L 12/823* (2013.01)
*H04L 12/715* (2013.01)

(56) References Cited

U.S. PATENT DOCUMENTS

| | | |
|---|---|---|
| 7,624,436 B2 | 11/2009 | Balakrishnan et al. |
| 8,160,579 B1* | 4/2012 | Rosenberg ................. 455/432.3 |
| 8,448,234 B2 | 5/2013 | Mondaeev et al. |
| 8,665,868 B2 | 3/2014 | Kay |
| 8,724,633 B2 | 5/2014 | Yu |
| 2003/0204626 A1 | 10/2003 | Wheeler |
| 2007/0056028 A1* | 3/2007 | Kay ................................ 726/11 |
| 2010/0208683 A1 | 8/2010 | Rayment et al. |
| 2011/0064081 A1 | 3/2011 | Lee et al. |
| 2011/0216853 A1* | 9/2011 | Poklemba ..................... 375/316 |
| 2014/0056137 A1* | 2/2014 | Kovvali et al. ............... 370/230 |
| 2014/0133348 A1 | 5/2014 | Agrawal et al. |

OTHER PUBLICATIONS

IBM TDB; Maruyama, K; Moss, FH; Woo, LS; Dynamic Addition of End Nodes to a Network Operated under Non Swap Explicit Path Routing; Dec. 1, 1980 (3 pages).
IBM TDB and Greenberg, SA; SNA/DS Data Processing End Node Implementation; May 1, 1991 (4 pages).

* cited by examiner

PERFORMING VALUE AND CONTEXT AWARE COMMUNICATIONS NETWORKING

GOVERNMENT RIGHTS

This invention was made with Government support under Contract No.: W911NF-06-3-0001 awarded by the U.S. Army. The Government may have certain rights in this invention.

TECHNICAL FIELD

The exemplary embodiments of this invention relate generally to communications networks and more particularly to performing value and context aware communications networking.

BACKGROUND

The networking infrastructure of a "smart" city or urbanized area may be called upon to support the task requirements of multiple end users such as a plethora of municipal, governmental, and public safety agencies. As these agencies execute various intra- and inter-agency tasks and missions, the networking infrastructure should be capable of supporting the communication needs of these tasks and missions. For example, modern packet-based communication systems strive to attain and maintain desirable network-level metrics in terms of bandwidth, delay, jitter, and probability of loss.

These metrics are often specified in terms of a desired Quality-of-Service (QoS). Transmissions may be organized and network resources provisioned to support a limited number of classes of service. For example, traffic-engineered Multiprotocol Label Switching (MPLS) may be employed to support a limited number of classes of service such as best-effort, constant-bit-rate, or variable-bit-rate. MPLS is a technique for directing data from one network node to the next based on short path labels rather than long network addresses, thereby avoiding complex lookups in a routing table. The labels identify virtual links (paths) between distant nodes rather than the endpoints themselves.

Depending on the intended end use of the information that is transported by the packets, improving performance at the network level in terms of QoS may not necessarily improve utility or value for end users. For example, several tasks may utilize video feeds which consume significant amounts of bandwidth. Illustrative tasks that are associated with video feeds include traffic control, safety surveillance, utility grid monitoring, and assisting first responders. Thus, several ongoing agency tasks may require the use of bandwidth-demanding video feeds collected from a large number of cameras that have been installed throughout a city. However, a particular video feed could comprise, for example, a scene of an empty street containing no activity of interest. Hence, the specific feed would be of low value, even though significant network resources are consumed to transport it. Dedicating precious resources to support a low-value task means that the network may lack additional resources to support contemporaneous high-value activities such as video feeds from a traffic accident, the scene of a crime, or a chemical spill. In order to support the information needs of tasks, activities, and missions in a smart city, there is a need for the underlying communication networks to become responsive to the needs of end-users as well as the nature of the tasks, activities, and missions that are to be executed, so as to increase the overall value of the information that is delivered to the end users.

SUMMARY

In one aspect thereof the exemplary embodiments of this invention provide a computer-executable method comprising: receiving one or more features associated with information to be transported by a communications network that includes a plurality of end nodes interconnected via a plurality of network nodes, wherein the one or more features are specified at an end node of for receipt by a network node; responsive to the one or more received features, configuring at least a portion of the communications network to perform actions on information based upon the features; receiving the information using the plurality of network nodes; and based at least on the received features and the configuring, performing one or more actions with the information wherein one or more actions comprise distributing the information to one or more edge entity nodes in accordance with the configuring and the received features.

In another aspect, an exemplary computer-executable method is provided comprising receiving one or more features associated with information to be transported by a communications network that includes a plurality of end nodes interconnected via a plurality of network nodes, wherein the one or more features are specified at an end node for receipt by a network node; configuring at least a portion of the communications network to perform actions on information based upon the features; receiving the information using the plurality of network nodes; and sending the information to one or more edge entity nodes in accordance with the configuring and the received features.

In yet another aspect, an exemplary computer-executable method is provided comprising receiving one or more features associated with information to be transported by a communications network that includes a plurality of end nodes interconnected via a plurality of network nodes, wherein the one or more features are specified at an end node for receipt by a network node; responsive to the one or more received features, configuring at least a portion of the communications network to perform one or more actions on information; receiving the information using the plurality of network nodes; and based at least on the received features and the configuring, sending the information to one or more edge entity nodes; wherein the configuring further includes creating one or more decision rules for processing one or more incoming packets transporting said information and arriving or expected to arrive at any of the plurality of network nodes, wherein the one or more features are indicative of a characteristic or category for the information, and wherein the one or more features are indicative of a value parameter for the information.

DETAILED DESCRIPTION

Figure 1:
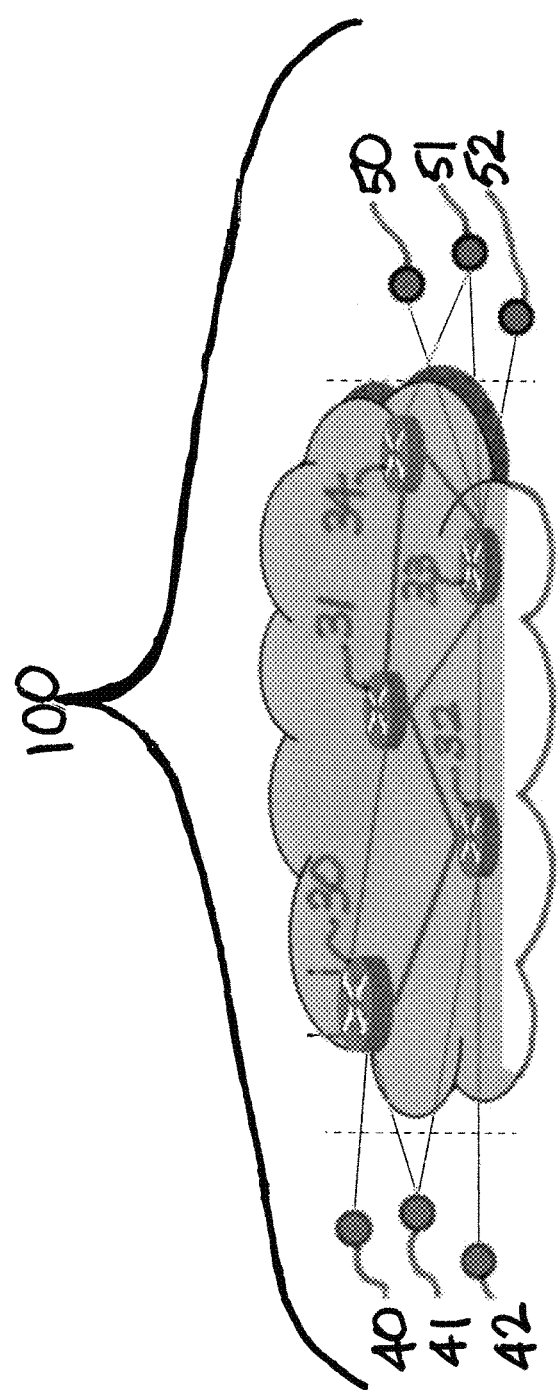
FIG. 1 is a block diagram of an exemplary communications network that can be used to implement and practice the embodiments of this invention.

FIG. 1 is a block diagram of an exemplary communications network 100 that can be used to implement and practice the embodiments of this invention. The communications network 100 includes a plurality of end nodes 40, 41, 42, 50, 51, 52 interconnected via a plurality of network nodes 30, 31, 32, 33, 34. The plurality of end nodes 40, 41, 42, 50, 51, 52 includes one or more edge entity nodes 50, 51, 52 and one or more information provider nodes 40, 41, 42. The one or more edge entity nodes 50, 51, 52 dynamically, automatically, and autonomously specify information needs and at least one operational context without a requirement for human intervention, as will be described in greater detail hereinafter. The one or more information provider nodes 40, 41, 42 gather information which is conveyed over one or more nodes of the plurality of network nodes 30, 31, 32, 33, 34 to the one or more edge entity nodes 50, 51, 52.

The one or more edge entity nodes 50, 51, and 52 are used by one or more users. These users may represent, for example, information seekers or information consumers. Alternatively or additionally, the one or more edge entity nodes 50, 51 and 52 may represent one or more sensors. Illustratively, the one or more edge entity nodes 50, 51, 52 are used by a single end user, a collection of multiple users, or a surrogate for one or more users. For example, a single end user may, but need not, comprise a service subscriber. A collection of multiple users may, but need not, comprise members of a group in a social network. A surrogate for one or more users may, but need not, comprise a service provider that defines one or more desired information features for a service it offers to its subscribers.

One or more features are specified at an edge entity node 50 of the one or more edge entity nodes 50, 51, 52 for receipt by at least one network node 30 of the plurality of network nodes 30, 31, 32, 33, 34. The one or more features are indicative of at least one characteristic or category for the information. Additionally or alternatively, the one or more features are indicative of a value parameter for the information. For example, a value parameter may specify that an edge entity node 50 is only interested in receiving video feeds that include a desired activity such as an object that is in motion, e.g., a truck crossing a particular intersection.

The distribution of features includes distribution of at least one characteristic of information content parameter. Illustratively, the characteristic of information content parameter may be conceptualized as identifying a type or category of information. The distribution of features is performed by at least a first node 30 of the plurality of network nodes 30, 31, 32, 33, 34. These features are distributed to one or more other nodes, such as node 31, of the plurality of network nodes 30, 31, 32, 33, 34. This distribution enables one or more of the plurality of network nodes 30, 31, 32, 33, and 34 to be configured in accordance with a value parameter or other information received from an edge entity node such as node 50. The configuration of one or more of the plurality of network nodes 30, 31, 32, 33, and 34 illustratively includes provisioning. At least one of the information type identifier or the characteristic of information content parameter are determined by an edge entity node 50 of the one or more edge entity nodes 50, 51, 52. Alternatively or additionally, at least one of the information type identifier or the characteristics of information content parameter are determined by an end user at the edge entity node 50. Alternatively or additionally, at least one of the information type identifier or the characteristic of information content parameter are determined by a sensor that is operatively coupled to the edge entity node 50. The information type identifier is indicative of a type of information such as, for example, video, audio, structured data, unstructured data, or text.

The characteristics of information content parameter is indicative of a desired characteristic or a triggering characteristic pertaining to received information. Illustratively, more than one characteristics of information content parameter may be utilized for the received information, so as to provide a plurality of characteristics of information content parameters. For example, the characteristics of information parameter may specify that information is to be collected only upon detection of the passing of a truck in the case of a video. In the case of structured data, the characteristics of information parameter may specify, for example, that air quality measurements are only to be collected upon the crossing or surpassing of a specified air quality threshold.

In addition to determining at least one of the information type identifier or the characteristics of information content parameter, the edge entity node 50 may also determine an operational context for information related to a specific task at hand. For example, an illustrative operational context may comprise any of current traffic conditions, a user's physical condition, or a location and time of data capture. The determined operational context is used to control an information flow corresponding to a feature of interest that is monitored by an information provider node 40 of the one or more information provider nodes 40, 41, 42 during execution of a monitoring task.

For example, the determined operational context may be used by the edge entity node 50 to change a threshold level corresponding to monitoring a vital sign of a hospital patient. The edge entity node 50 will now receive information, for example, only if the threshold level is met or exceeded. Alternatively, the edge entity node 50 can be programmed to receive information, for example, only if the threshold level is not exceeded. Alternatively or additionally, the determined operational context may be used by the edge entity node 50 to determine which types of information or how much information will be received at the edge entity node 50. For example, the edge entity node 50 may be programmed to transmit only high-emergency alerts to a user who is currently located in an office complex, whereas a user who is currently located at the scene of an accident is only sent information by the edge entity node 50 that pertains to the accident.

In response to the one or more distributed features that are distributed by the edge entity node 50, the plurality of network nodes 30, 31, 32, 33, and 34 are configured to perform actions on information based on the distributed features. Illustratively, the plurality of network nodes 30, 31, 32, 33, and 34 are configured by provisioning the nodes. In accordance with the provisioning, information from the one or more information provider nodes 40, 41, 42 is then distributed by one or more of the plurality of network nodes 30, 31, 32, 33 and 34 to one or more of the edge entity nodes 50, 51, or 52. Provisioning may include storing one or more states and creating decision rules for processing information flows arriving or expected to arrive at one or more network nodes 30, 31, 32, 33 or 34.

Distribution of the information by one or more of the plurality of network nodes 30, 31, 32, 33 and 34 may include any of selecting one or more alternative transmission interfaces, providing feedback, replicating one or more transmissions, dropping one or more packets, downsampling, upsampling, or padding data with error correction codes. Alternatively or additionally, distribution may include selecting which of a plurality of information streams are to be transmitted first (priority scheduling) over other flows based on the distributed features and information pertaining to one or more of the edge entity nodes 50, 51, 52. Alternatively or additionally, distribution may include changing an underlying network configuration for the communications network 100, such as changing at least one of wireless transmit power or wireless transmission rate based on the distributed features and information pertaining to one or more of the edge entity nodes 50, 51, 52.

As described above, end users, such as edge entity nodes 50, 51, 52 of a network, desire or require certain features associated with information. For instance, in the video feed example provided previously, an end user desires or requires a video feed that is associated with a high traffic volume (for example, a feature), but instead may receive video with little or no traffic volume using a prior art approach. To correct this shortcoming, in an exemplary embodiment, these types of features are distributed to network nodes that are intermediate provider nodes configured to convey video from a camera or from an upstream node to a downstream node, and these features are also distributed to edge entity nodes 50, 51, 52 used to receive the video. One or more of the network nodes 30, 31, 32, 33, 34 make decisions, based on the features and also provisioning corresponding to the features, in order to determine actions to be taken for information passing through one or more network nodes 30, 31, 32, 33, 34. For the exemplary feature of high traffic volume in a video, a network node 30 may only, for instance, forward video having some minimum traffic volume to the edge entity nodes 50, 51, 52.

Figure 2:
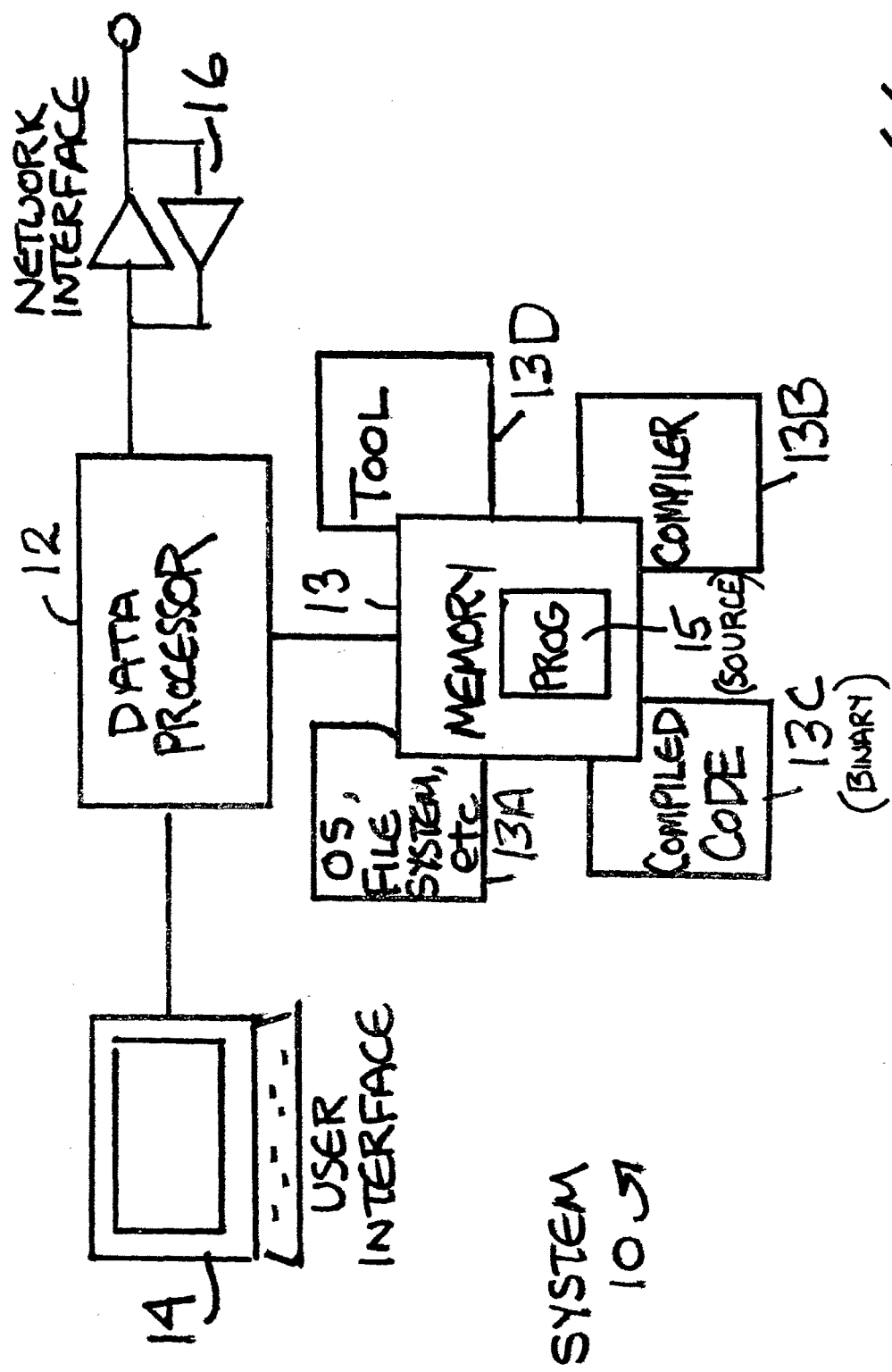
FIG. 2 is a block diagram of an exemplary computer system or data processing system that can be used to implement and practice the embodiments of this invention.

FIG. 2 is a block diagram of an exemplary computer system or data processing system 10 that can be used to implement and practice the embodiments of this invention. Illustratively, the system of FIG. 2 may be used to implement one or more of the edge entity nodes 50, 51, 52 depicted in FIG. 1. Additionally or alternatively, the system of FIG. 2 may be used to implement one or more nodes of the plurality of network nodes 30, 31, 32, 33, and 34 (FIG. 1). Additionally or alternatively, the system of FIG. 2 may be used to implement one or more of the information provider nodes 40, 41, 42 depicted in FIG. 1.

Returning to FIG. 2, the system 10 includes at least one data processor 12 connected with at least one memory 13. The memory 13 stores data and programs, such as an operating system (OS) 13A and related programs such as a file system. The memory 13 also stores an application program 15 (source code) written by a programmer or programmers using, for example, a local user interface 14 and/or a remote user interface via a suitable network interface 16. The application program 15 can be, for example, any application that is written in a programming language designed to communicate instructions to a machine. An exemplary target configuration for the application program 15 can be a communications network 100 (FIG. 1) comprised of nodes as shown in FIG. 1 and described previously.

The memory 13 (FIG. 2) stores a program that implements a compiler 13B. The compiler 13B produces compiled code 13C from the application program 15. For illustrative purposes, one suitable compiler is the XL UPC Compiler that is available from the assignee of this patent application. The memory 13 can also store a further program that implements a tool 13D that operates in accordance with the exemplary embodiments of the invention. The tool 13D can be invoked by the programmer using, for example, the user interface 14. The tool 13D enables the programmer to at least analyze shared memory accesses by the application program 15.

Note that the tool 13D need not be instantiated in the memory 13, and could be resident on another system such as on another physical system connected through the network interface 16, or on a virtual system in a cloud computing environment. That is, the tool 13D need not be co-resident in the same memory as the compiler 13B and/or the compiled code 13C and/or the source code (application program) 15.

Figure 3:
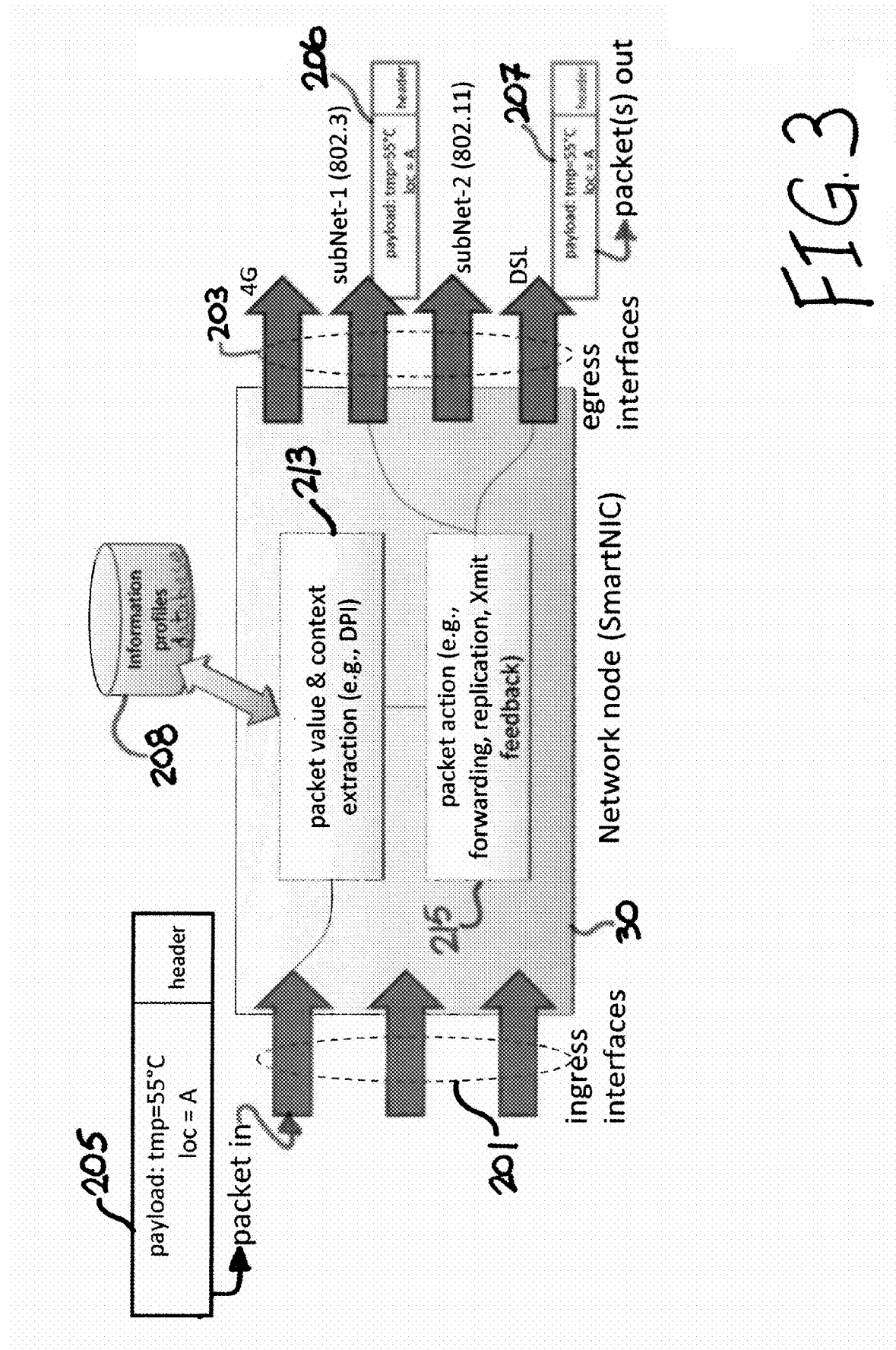
FIG. 3 is a block diagram of an exemplary network node that can be used to implement and practice the embodiments of the invention.

FIG. 3 is a block diagram of an exemplary network node 30 (FIGS. 1 and 3) that can be used to implement and practice the embodiments of the invention. The network node 30 is a smart node that may be implemented, for example, using a smart network interface card (SmartNIC). The SmartNIC is a card that combines information technology (IT) processing with networking processing and can perform operations at wire speed. SmartNICs may be based, for example, upon PowerEN, a next generation network processor available from IBM in Armonk, N.Y. The SmartNIC may, but need not, be equipped with any of various accelerators including regex, crypto, compression/decompression accelerators, and high-speed network adapters.

Illustratively, the edge entity nodes 50, 51, 52 (FIG. 1) are used by end users, sensors, intelligent agents, or various combinations thereof The smart network node 30 (FIGS. 1 and 3) stores features received from any of the edge entity nodes 50, 51, 52 (FIG. 1) in an information profiles database 208 (FIG. 3). These features may be conceptualized, for example, as requirements or specifications. Thus, the information profiles database 208 represents a repository of information profiles that a SmartNIC-equipped network node 30 (FIGS. 1 and 3) consults before deciding what action to take regarding an incoming packet 205 as, for example, deciding how the incoming packet 205 is to be distributed. In response to the receipt of the features, the SmartNIC-equipped network node 30 (FIGS. 1 and 3) performs a deep packet inspection (DPI) 213 on incoming network traffic, such as an incoming packet 205 received over an ingress interface 201, to extract the value parameter and the operational context from the incoming packet 205. The value parameter and the operational context were discussed previously in connection with FIG. 1. According to some embodiments, the aforementioned DPI functionality is performed by a general processor unit. However, according to other embodiments, the DPI functionality is performed by special-purpose hardware such as a SmartNIC as discussed previously.

Based upon the DPI 213, a packet action 215 is performed which specifies the manner in which the incoming packet 205 is to be distributed. More specifically, the packet action 215 determines how the incoming packet 205 should be handled, processed, forwarded, or various combinations thereof. The packet action 215 also determines how much network resources should be dedicated to the incoming packet 205. In the example of FIG. 3, the incoming packet 205 is distributed by the packet action 215 to an egress interface 203 as a first outgoing packet 206 on a first subnet (subnet-1) and a second outgoing packet 207 on a second subnet (subnet-2).

The combination of DPI 213 in conjunction with context and value awareness of end users and entities provides a mechanism that is responsive to the dynamic needs of these end users and entities. The DPI 213 also provides a mechanism for dynamically changing the characteristics of information flow. For example, instead of sending full-motion video to a large group of end users, only certain specific key frames are sent to a subset of the large group of end users. The packet processing and transmission processes performed using the DPI 213 and the packet action 215 are implemented by utilizing a data path of the smart network node 30. The information profiles database 208 (along with any of various processes of operating) uses the control path of the smart network node 30.

Machine-readable representations of the information profiles stored in the information profiles database 208 are distributed through one or more smart network nodes, such as the smart network node 30 or any other node that is equipped with the SmartNIC such as, for example, network node 33 (FIG. 1). In response to the information profiles, the smart network node 30 balances the information flows passing through the plurality of network nodes 30, 31, 32, 33, 34. This balancing procedure can be implemented using techniques such as hardware-assist accelerators to inspect and interpret information fields in a packet at wire speeds. With the help of the smart network node 30, any network nodes 31, 32, 33, 34 that are smart network nodes can determine whether information carried in a packet payload of the incoming packet 205 relates to any information need of a task as defined by a task information profile stored in the information profiles database 208.

Should the incoming packet 205 (or a collection of incoming packets) be found to contain information related to a task's information profile, for example, the temperature at location A is less or equal to 55° F., the smart network node 30 can take an action on the incoming packet 205 based on this task information profile and other task information profiles which the smart network node 30 may access. A collection of related incoming packets may be a sequence of affiliated packets, such as a sequence of packets that cover a video frame with, for example, a truck moving through a scene.

Figure 4:
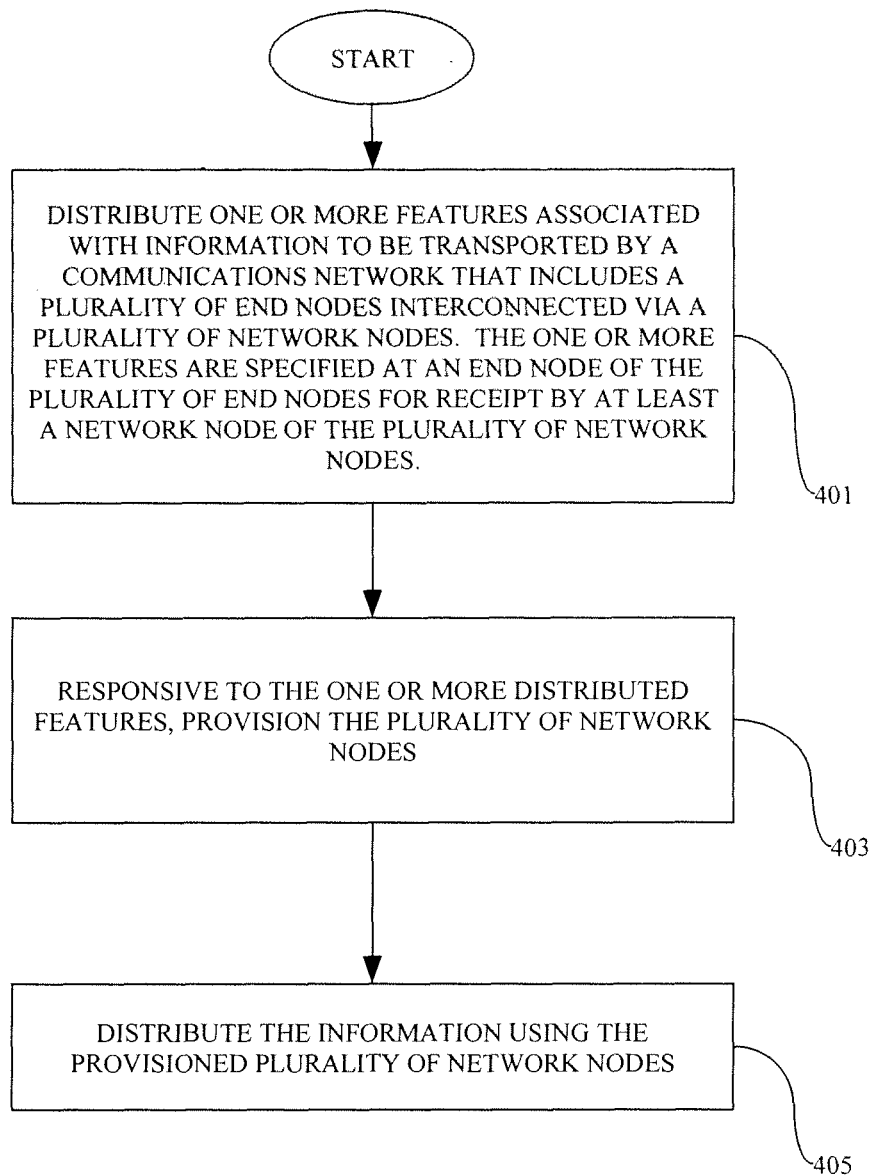
FIG. 4 is a flowchart that illustrates an exemplary operational sequence for implementing and practicing the embodiments of the invention.

FIG. 4 is a flowchart that illustrates an exemplary operational sequence by which the exemplary smart network node 30 (FIGS. 1 and 3) implements and practices the embodiments of the invention. The operational sequence commences at block 401 where one or more features associated with information to be transported by a communications network are distributed. The one or more features are indicative of at least one characteristic or category for the information, and the one or more features are also indicative of a value parameter for the information. The communications network includes a plurality of end nodes interconnected via a plurality of network nodes, wherein the one or more features are specified at an end node of the plurality of end nodes for receipt by a network node of the plurality of network nodes.

The operational sequence of FIG. 4 progresses to block 403 where, responsive to the one or more distributed features, the plurality of network nodes are configured, illustratively by provisioning the plurality of network nodes. The provisioning may, but need not, include storing a state and creating one or more decision rules for processing information flows of incoming packets arriving or expected to arrive at any of the plurality of network nodes 30, 31, 32, 33, 34 (FIG. 1).

Next, at block 405 (FIG. 4), the information is distributed using the provisioned plurality of network nodes. The distribution of block 405 is performed by taking an action on an incoming packet 205 (FIG. 3) or collection of incoming packets. The action is applied to information that is received in accordance with provisioned operations. Alternatively or additionally, the action is applied to information that is expected to be received but that is not received. This action may include any of dropping one or more packets, delaying transmission of one or more packets, selecting one or more alternative transmission interfaces, or selecting which of a plurality of incoming packets or incoming packet streams should be transmitted first (priority scheduling) over other incoming packets or incoming packet streams. The priority scheduling may, but need not, be based upon one or more features or information about one or more edge entity nodes 50, 51, 52 (FIG. 1).

Additionally or alternatively, the actions of block 405 (FIG. 4) may include any of processing the content of one or more packets prior to sending these one or more packets downstream, illustratively to provide content aggregation such as averaging the values of a parameter acquired through observation (for example, temperature, air pressure, etc.). Alternatively or additionally, the actions may include changing an underlying network configuration, such as one or more of wireless transmit power or wireless transmission rate. The underlying network configuration may, but need not, be based upon one or more features or information about one or more edge entity nodes 50, 51, 52 (FIG. 1).

Additionally or alternatively, these actions may include any of replicating (for multicast) the packet and its contents, or replicating over multiple interfaces and network modalities (for increased reliability), downgrading the quality of an image, configuring a network interface so that the content can be transmitted with higher fidelity and range, or padding the content with error correction codes for improved robustness. The smart network node 30 may also provide feedback to its upstream nodes and even the information source (i.e., information provider node 40 (FIG. 1)) about the action or actions the smart network node 30 takes on the content of packets it transmits downstream. This feedback could be in addition to a regular per-packet-level feedback that a network node may customarily send upon receipt of a packet from an upstream node. As a result, an upstream node may replay (all the way from the information source), or retransmit (from an upstream node) a video feed since, for example, timestamp T (because of packet loss related to this timestamp), but only under certain conditions, say, if motion of a truck is present.

As should be appreciated by one skilled in the art, aspects of the present invention may be embodied as a method, a computer-readable memory, a data processing system, a semiconductor device for implementing a smart network node, or as a combination of these. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "device", "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document a computer readable storage medium may be any tangible, non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the computer, partly on the computer, as a stand-alone software package, partly on the computer and partly on a remote computer or entirely on the remote computer or server. In the latter scenario, the remote computer may be connected to the computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, devices, apparatuses, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As such, various modifications and adaptations may become apparent to those skilled in the relevant arts in view of the foregoing description, when read in conjunction with the accompanying drawings and the appended claims. As but some examples, the use of other similar or equivalent mathematical expressions may be used by those skilled in the art. However, all such and similar modifications of the teachings of this invention will still fall within the scope of this invention.

What is claimed is:

1. A computer-executable method comprising:
    determining an operational context to be used by an edge entity node to determine a type or types of information or a quantity of information to be received at the edge entity node, wherein the determined operational context is used to control information to be transported corresponding to one or more features of interest monitored by an information provider node of one or more information provider nodes during execution of a monitoring task;
    receiving by a network node of a communications network the one or more features associated with the information to be transported by the communications network that includes a plurality of end nodes interconnected via a plurality of network nodes, wherein the one or more features are specified at an end node for receipt by the network node;
    responsive to the one or more received features, configuring at least a portion of the communications network to perform actions on information based upon the features;
    receiving the information using the plurality of network nodes; and
    based at least on the received features and the configuring, executing a monitoring task by performing one or more actions corresponding to the operational context with the information wherein one or more actions comprise distributing the information to one or more edge entity nodes of the communications network in accordance with the configuring and the received features, wherein the distributing of the information further comprises selecting which of a plurality of incoming packets or incoming packet streams to transmit first over other incoming packets or incoming packet streams.

2. The computer-executable method of claim 1 wherein the configuring further includes creating one or more decision rules for processing one or more incoming packets transporting said information and arriving or expected to arrive at any of the plurality of network nodes, wherein the one or more features are indicative of at least one characteristic or category for the information, and wherein the one or more features are indicative of a value parameter for the information.

3. The computer-executable method of claim 1 wherein the distributing of the information further includes selecting one or more alternative transmission interfaces for the information.

4. The computer-executable method of claim 1 wherein the distributing of the information further comprises dropping a packet.

5. The computer-executable method of claim 1 wherein the distributing of the information further comprises downsampling.

6. The computer-executable method of claim 1 wherein the distributing of the information further comprises upsampling.

7. The computer-executable method of claim 1 wherein the distributing of the information further comprises padding data with error correction codes.

8. The computer-executable method of claim 1 wherein the selecting is based upon the one or more features.

9. The computer-executable method of claim 1 wherein the selecting is based upon information received from any of the plurality of end nodes.

10. The computer-executable method of claim 1 wherein the distributing of the information further comprises changing an underlying network configuration for the communications network including a wireless transmit power.

11. The computer-executable method of claim 1 wherein the distributing of the information further comprises changing an underlying network configuration for the communications network including a wireless transmission rate.

12. The computer-executable method of claim 11, wherein the underlying network configuration is changed based upon the one or more features.

13. The computer-executable method of claim 11 wherein the underlying network configuration is changed based upon information received from any of the plurality of end nodes.

14. A computer-executable method comprising:
    determining an operational context to be used by an edge entity node to determine a type or types of information or a quantity of information to be received at the edge entity node, wherein the determined operational context is used to control information to be transported corresponding to one or more features of interest monitored by an information provider node of one or more information provider nodes during execution of a monitoring task;
    receiving by a network node of a communications network the one or more features associated with the information to be transported by the communications network that includes a plurality of end nodes interconnected via a plurality of network nodes, wherein the one or more features are specified at an end node for receipt by the network node;
    configuring at least a portion of the communications network to perform actions on information based upon the features;
    receiving the information using the plurality of network nodes; and
    sending corresponding to the operational context the information to one or more edge entity nodes of the communications network in accordance with the configuring and the received features, wherein the sending further comprises selecting which of a plurality of incoming packets or incoming packet streams to transmit first over other incoming packets or incoming packet streams.

15. A computer-executable method comprising:
    determining an operational context to be used by an edge entity node to determine a type or types of information or a quantity of information to be received at the edge entity node, wherein the determined operational context is used to control information to be transported corresponding to one or more features of interest monitored by an information provider node of one or more information provider nodes during execution of a monitoring task;
    receiving by a network node of a communications network the one or more features associated with the information to be transported by the communications network that includes a plurality of end nodes interconnected via a plurality of network nodes, wherein the one or more features are specified at an end node for receipt by the network node;
    responsive to the one or more received features, configuring at least a portion of the communications network to perform one or more actions on information;
    receiving the information using the plurality of network nodes; and based at least on the received features and the configuring, sending corresponding to the operational context the information to one or more edge entity nodes of the communications network;

wherein the configuring further includes creating one or more decision rules for processing one or more incoming packets transporting said information and arriving or expected to arrive at any of the plurality of network nodes, wherein the one or more features are indicative of a characteristic or category for the information, wherein the one or more features are indicative of a value parameter for the information, and wherein the processing further comprises selecting which of a plurality of incoming packets or incoming packet streams to transmit first over other incoming packets or incoming packet streams.

* * * * *